(12) United States Patent
Liimatta et al.

(10) Patent No.: US 8,567,375 B2
(45) Date of Patent: Oct. 29, 2013

(54) SYSTEM FOR IMPROVING ENGINE CRANKCASE VENTILATION VIA A CONDUIT

(75) Inventors: Gary David Liimatta, Milan, MI (US); Thomas Edward Smith, Livonia, MI (US); Frank Acierno Valencia, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 387 days.

(21) Appl. No.: 12/868,219

(22) Filed: Aug. 25, 2010

(65) Prior Publication Data

US 2012/0048249 A1    Mar. 1, 2012

(51) Int. Cl.
*F01M 13/00*    (2006.01)

(52) U.S. Cl.
USPC .................................................. 123/572

(58) Field of Classification Search
USPC ....................... 123/572–574, 41.86
See application file for complete search history.

(56) References Cited

U.S. PATENT DOCUMENTS

| | | | | |
|---|---|---|---|---|
| 2,128,154 A | * | 8/1938 | Masters | 123/572 |
| 2,302,322 A | | 11/1942 | Howard | |
| 2,489,230 A | * | 11/1949 | Winkler | 123/572 |
| 3,924,588 A | * | 12/1975 | Hager | 123/574 |
| 4,068,635 A | * | 1/1978 | Yunick | 123/572 |
| 4,515,137 A | | 5/1985 | Manolis | |
| 4,760,833 A | * | 8/1988 | Tatyrek | 123/574 |
| 5,067,449 A | * | 11/1991 | Bonde | 123/41.86 |
| 5,373,957 A | | 12/1994 | Gryc | |
| 6,640,793 B1 | | 11/2003 | Kabat et al. | |
| 7,159,582 B2 | | 1/2007 | Nakajima et al. | |
| 7,431,023 B2 | | 10/2008 | Kavanagh et al. | |
| 2005/0227607 A1 | | 10/2005 | Stevenson et al. | |
| 2008/0185541 A1 | | 8/2008 | Ukpai et al. | |
| 2009/0090337 A1 | * | 4/2009 | Asanuma et al. | 123/574 |
| 2009/0235907 A1 | | 9/2009 | Satou | |
| 2009/0301446 A1 | | 12/2009 | Asanuma et al. | |

FOREIGN PATENT DOCUMENTS

| | | |
|---|---|---|
| JP | 56017748 A | 2/1981 |
| JP | 358128448 A | 8/1983 |

OTHER PUBLICATIONS

Valencia, Frank Acierno et al. "System for Improving Engine Crankcase Ventilation," U.S. Appl. No. 12/868,152, filed Aug. 25, 2010, 34 pages.

* cited by examiner

*Primary Examiner* — M. McMahon
(74) *Attorney, Agent, or Firm* — Julia Voutyras; Alleman Hall McCoy Russell & Tuttle LLP

(57) ABSTRACT

A system for improving PCV flow of an engine is presented. The system can reduce engine oil consumption when an engine is exposed to lateral or centripetal force. In one example, the system includes a mechanically operated valve that acts to limit PCV flow in a conduit external to an engine.

11 Claims, 6 Drawing Sheets

US 8,567,375 B2

SYSTEM FOR IMPROVING ENGINE CRANKCASE VENTILATION VIA A CONDUIT

FIELD

The present description relates to a system for improving engine crankcase ventilation. The system may be particularly useful for engines that may experience higher levels of lateral acceleration.

BACKGROUND AND SUMMARY

An engine provides torque by combusting an air-fuel mixture in an engine cylinder. The combustion increases pressure and temperature within the cylinder to cause a piston within the cylinder to move. The moving piston applies a force to the engine crankshaft and causes it to rotate, thereby providing engine output torque. However, some portion of the cylinder gases may pass by the piston and enter the engine crankcase. The gases that enter the engine crankcase can be evacuated and reintroduced to the engine intake system so that engine hydrocarbon emissions may be reduced. In some engine systems, the crankcase gases flow from the crankcase to the engine intake via a positive crankcase ventilation (PCV) valve located along the PCV path. In some example systems, the PCV path starts at a valve cover and ends at the intake manifold. During engine operation, the PCV valve increases a restriction between the intake system and the crankcase during periods of higher intake manifold vacuum, and it reduces the restriction between the intake manifold and the crankcase during periods of lower intake manifold vacuum. In this way, the engine crankcase can be maintained at a slight vacuum so that hydrocarbons may be drawn from the engine crankcase to the engine intake system.

Although evacuating the engine crankcase of gases can reduce engine emissions, it also poses other issues. For example, under some conditions, it is possible to draw oil or oil mist through the PCV valve. In U.S. Pat. No. 4,515,137, a flow restriction is placed in the PCV path to limit the amount of oil drawn via vapor through the PCV path and into the engine. The oil precipitates out of the vapors when the vapors impinge on the restriction.

The above-mentioned method can also have several disadvantages. Specifically, the restriction in U.S. Pat. No. 4,515,137 can still allow oil to flow to the engine intake system if engine oil accumulates at PCV path inlet. In particular, the possibility of drawing oil from the engine crankcase and cylinder heads to the PCV path increases when the engine is exposed to lateral or centripetal force, and the restriction shown in U.S. Pat. No. 4,515,137 appears to offer little protection from oil egress related to lateral or centripetal force. Lateral or centripetal force may be experienced by an engine when a driver enters a curve or drives in a circle on a skid pad. The engine and vehicle tend to stay in a straight path, but the vehicle tires exert a force on the pavement that causes the vehicle and engine to turn. Likewise, the engine oil tends to stay on a straight path so it tends to accumulate at one side of the engine depending on the direction of lateral or centripetal force. In V configuration engines, the cylinder heads define the widest extent of the engine. As such, engine oil tends to accumulate in one of the engine cylinder heads during periods when the engine is exposed to lateral or centripetal forces. The engine oil that accumulates in the cylinder head as a result of lateral or centripetal acceleration can increase the possibility of passing oil through the PCV path in some systems since liquid oil may be driven into the PCV path.

The inventors herein have recognized the above-mentioned disadvantages and have developed an engine system for improving engine crankcase ventilation. One example of the present description includes an engine system, comprising: an engine having a crankcase and an intake system; a PCV conduit linking the crankcase and the intake system; a mechanically operated valve located along the PCV conduit, the mechanically operated valve activated when lateral or centripetal force acting on an engine exceeds a threshold amount, the mechanically operated valve limiting flow from a crankcase of the engine to a PCV passage when activated.

By closing a valve during times of higher lateral or centripetal force, it is possible to limit flow between an engine crankcase and intake system so that less oil is drawn into the engine intake system. In one example, a valve is comprised of a flapper that is coupled to a hinge. The hinge allows the flapper to respond to lateral and centripetal forces acting on the engine. For example, if a threshold amount of lateral force is exerted on an engine during a maneuver, the valve can close and limit the flow of vapors and liquid oil into the PCV path. Consequently, engine emissions and oil consumption may be reduced.

The present description may provide several advantages. In particular, the approach may reduce engine emissions that are related to a PCV system. Further, the present description may reduce system cost as expensive pumps may not be required to limit oil flow through the PCV system. Further still, the present description may provide simplified engine controls since the system in some examples may limit PCV path flow by a sole mechanically actuated device.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 2:
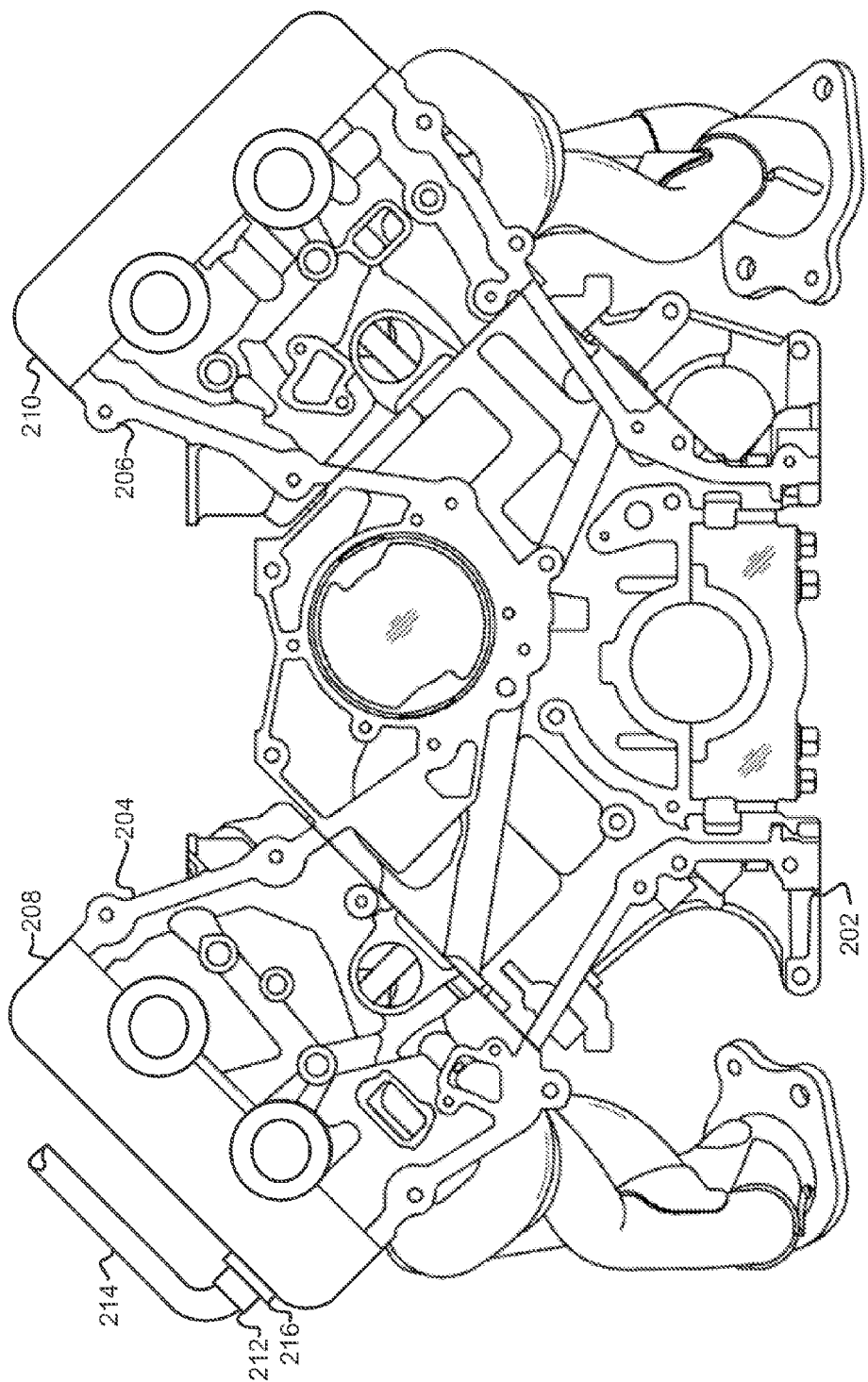
FIG. 2 is a schematic diagram of example V-8 engine showing part of a PCV path.

The present description is related to PCV flow of an internal combustion engine. In one embodiment, an eight cylinder engine as shown in FIG. 2 and having a lateral force PCV valve as shown in FIGS. 3-6B improves PCV flow by limiting oil intrusion into the PCV path. FIG. 7 shows a method for controlling PCV flow during periods of higher lateral or centripetal forces.

Figure 1:
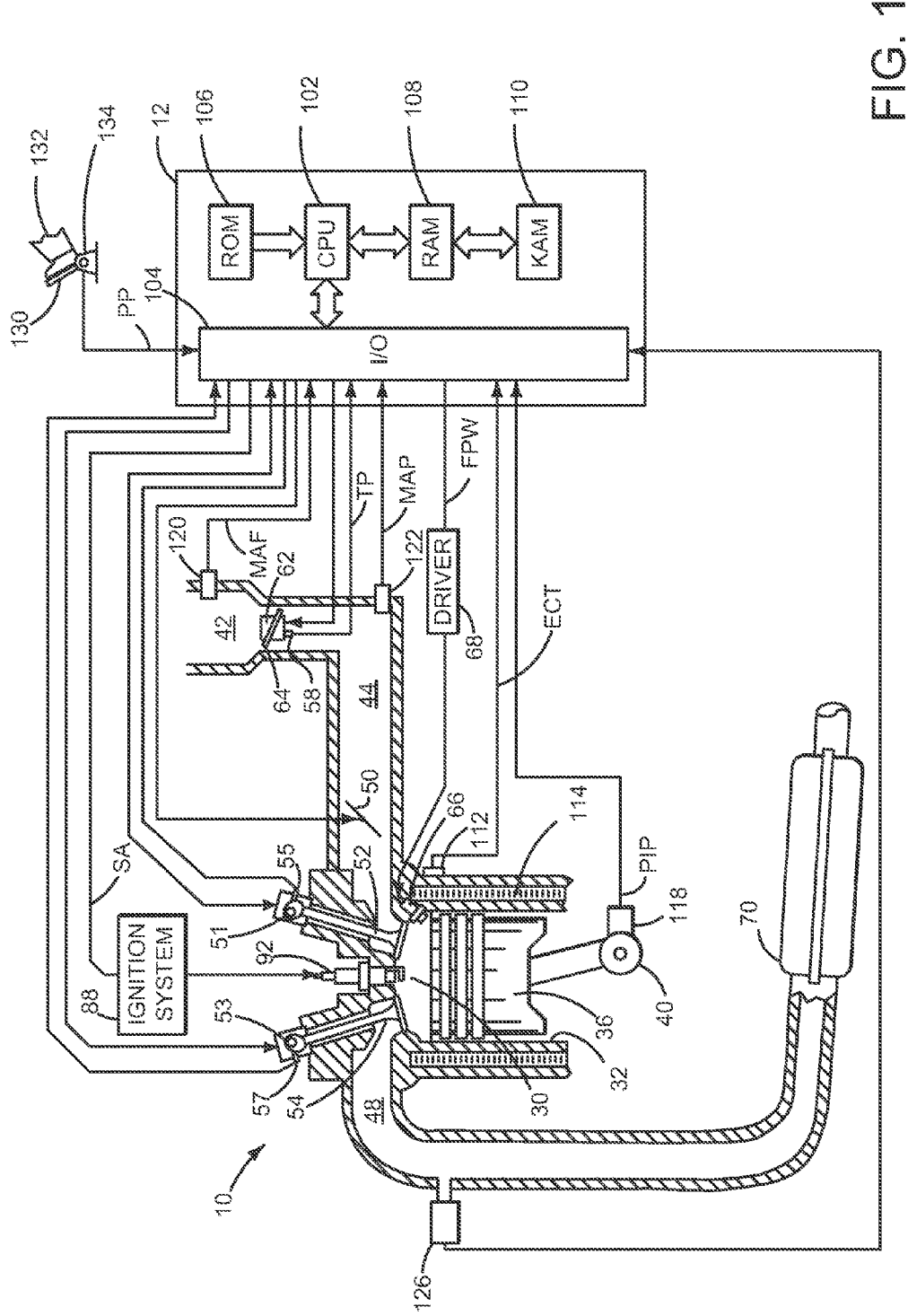
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. Intake manifold 44 includes charge motion control valve 50 for controlling charge motion within cylinder 30. In one example, a low pressure direct injection system may be used, where fuel pressure can be raised to approximately 20-30 bar. Alternatively, a high pressure, dual stage, fuel system may be used to generate higher fuel pressures.

Engine 10 is separated into two regions for lubrication purposes. The first region comprises the path air passes through engine 10 and it includes the intake manifold, intake runners within the cylinder head, the combustion chamber, and exhaust ports leading from the cylinder. The second region includes the engine crankcase, cylinder head area having moving components excluding the combustion chamber, and oil galleries. Pressurized engine oil is supplied to the second region to lubricate moving components within the engine while it is desirable to keep oil from entering the first region. However, oil may be present at boundaries between the two regions to lubricate moving parts, at cylinder walls for example.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, a schematic diagram of a V-8 engine is shown. Cylinder heads 204 and 206 are coupled to engine block 202. Valve covers 208 and 210 are coupled to cylinder heads 204 and 206 respectively. Valve covers 208 and 210 limit oil flow from cylinder heads 204 and 206 to the surrounding environment. Oil is supplied to cylinder heads 204 and 206 to lubricate camshafts, valves, and other moving components via an oil pump (not shown). Oil supplied to cylinder heads 204 and 206 is returned to an oil pan (not shown) coupled to the bottom of engine block 202 via oil galleries. Oil flows from cylinder heads 204 and 206 to the oil pan by gravity. PCV path is comprised of PCV conduit 214, PCV valve 212, and lateral force PCV valve 216. In some examples, PCV valve 212 and lateral force PCV valve 216 may be integrated as a single valve assembly. Lateral force PCV valve 216 may be configured as one of the valves shown in FIGS. 3-5. Alternatively, lateral force PCV valve 216 may be configured along the length of PCV conduit 214 as shown in FIGS. 6A and 6B. PCV conduit 214 extends from the valve cover and it is coupled to the intake system at the intake manifold (not shown) or in the duct work leading to the intake manifold (not shown). PCV conduit 214 may be positioned on the engine assembly such that an inline valve (e.g. See FIGS. 6A-6B and 7A-7B) can be placed along the length of PCV conduit 214.

Figure 3:
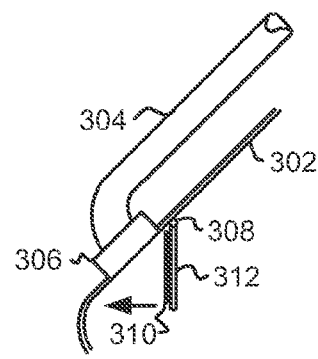
FIG. 3 is a schematic diagram of an example lateral force PCV valve.

Referring now to FIG. 3, a schematic diagram of an example lateral force PCV valve is shown. Lateral force PCV valve 312 is coupled to valve cover 302 via hinge 308 and it closes in the direction of the arrow. In some examples, lateral force PCV valve 312 includes a seal (e.g., an elastomer seal) to limit oil flow into PCV valve 312 and conduit 304. PCV valve 306 is coupled to the outside of valve cover 302 and conduit 304 routes crankcase vapors to the intake manifold (not shown) or to the intake ducting (not shown).

Lateral force PCV valve 312 is coupled to hinge 308 such that lateral force PCV valve does not move substantially when fore or aft forces are applied to the engine. Thus, when the vehicle in which the engine and lateral force PCV valve are mounted accelerates in a straight line, lateral force PCV valve remains in substantially the same position. However, when the engine is exposed to lateral forces in one direction (e.g. during a left-hand turn), lateral force PCV valve 312 can swing closed. When the engine is exposed to lateral forces in the other direction (e.g., during a right-hand turn), lateral force PCV valve remains in an open position by swinging away from PCV valve 306. By closing, lateral force PCV valve limits the possibility of engine oil entering PCV valve 306 and conduit 304 during vehicle maneuvers where lateral or centripetal forces can cause engine oil to accumulate in cylinder heads (e.g., between the cylinder heads and the valve covers). After the maneuver is complete, the lateral force PCV valve moves to an open position as the force of gravity exceeds the lateral or centripetal force. It should be noted that the size and weight of lateral PCV valve 312 can be adjusted so that lateral PCV valve opens even in the presence of a vacuum in conduit 304. For example, when lateral PCV valve 312 closes in response to a lateral or centripetal force, a vacuum from the intake system presented via conduit 304 can act to keep lateral PCV valve 312 closed. However, the size and weight of lateral PCV valve 312 can be adjusted so that the force of gravity acting on the lateral PCV valve exceeds a threshold vacuum level to keep the lateral PCV valve 312 in a closed position. In one example, the size and weight of lateral PCV valve 312 is adjusted so that lateral PCV valve opens when intake manifold vacuum is less than 0.6 atmospheres.

Figure 4:
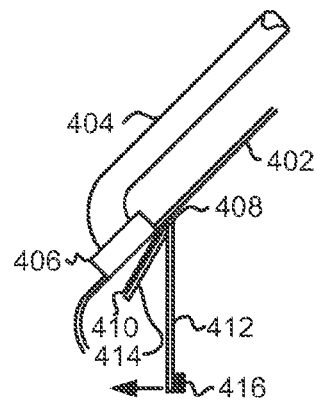
FIG. 4 is a schematic diagram of an example lateral force PCV valve.

Referring now to FIG. 4, a schematic diagram of an example lateral force PCV valve is shown. In this example, the lateral force PCV valve is comprised of flapper 414, seal 410, hinge 408, weight 416, and lever 412. Flapper 414 and lever 412 may be comprised of a single piece of material such that a constant angle is maintained between flapper 414 and lever 412. Hinge 408 is coupled to valve cover 402. PCV valve 406 is also coupled to valve cover 402. PCV valve 406 limits flow of vapors from a cylinder head and engine crankcase to the engine intake system. As described with reference to FIG. 3, conduit 404 puts PCV valve in communication with the engine intake manifold or intake system ducting.

The lateral force PCV valve of FIG. 4 is similar to lateral force PCV valve 312 of FIG. 3 except that the lateral force PCV valve of FIG. 4 includes lever 412 and weight 416. Lever 412 and weight 416 can improve valve opening and closing by effectively adjusting the force required to open and close flapper 414. For example, after a lateral force closes flapper 414 in the direction of the arrow, gravity acting on lever 412 and weight 416 can open flapper 414 sooner than if lever 412 and weight 416 are omitted. Lever 412 allows the force of gravity or the propensity of a mass to stay on its trajectory to be increased by applying the force through a distance. Thus, the length of lever 412 and the mass of weight 416 can be adjusted to change a level of vacuum when level flapper 414 is released at a time when no lateral force is applied to the engine and vehicle. For example, a lever having a length of 5 cm may release when a vacuum level in conduit 404 is less than 0.5 atmospheres. If the lever length is increased to 9 cm the release vacuum level in conduit 404 may be reduced to 0.45 atmospheres. In this way, the length of lever 412 may be adjusted to vary the vacuum level at which flapper 414 is released. Similarly, the length of lever 412 and the mass of weight 416 can be adjusted so that flapper 414 closes in response to different levels of lateral or centripetal force. In addition, the angle between flapper 414 and lever 412 can be adjusted to vary the level of lateral or centripetal force that closes flapper 414 as well as the amount of closing vacuum that can be overcome to open flapper 414.

Figure 5:
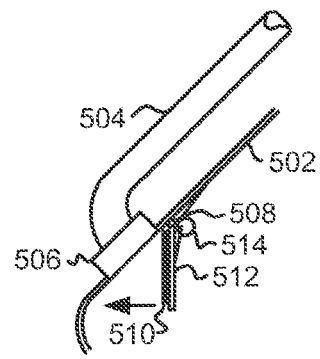
FIG. 5 is a schematic diagram of an example lateral force PCV valve.
Figure 6A:
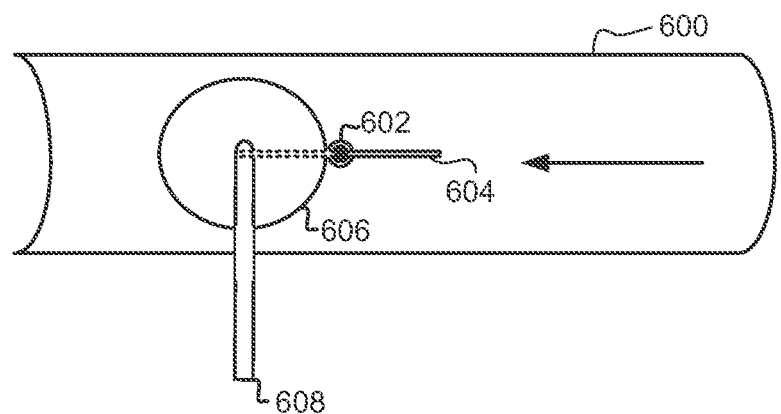
FIG. 6A is a schematic diagram of an example lateral force PCV valve.
Figure 6B:
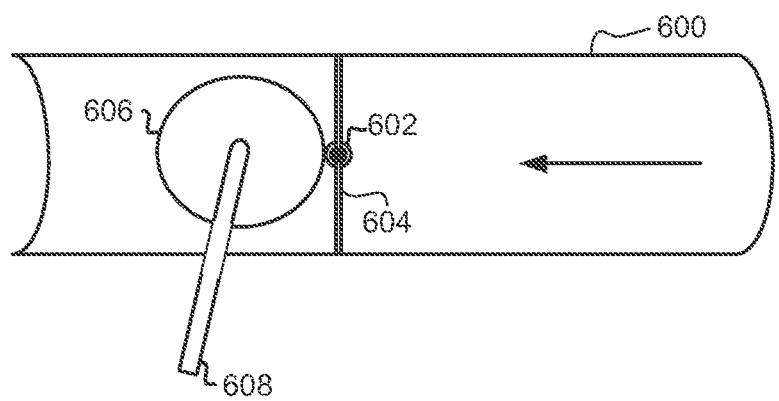
FIG. 6B is a schematic diagram of an example lateral force PCV valve.

Referring now to FIG. 5, a schematic diagram of an example lateral force PCV valve is shown. Lateral force valve 512 is similar to the lateral force valve shown in FIG. 3 except that lateral force valve 512 includes spring 514 to assist the opening of lateral force valve 512. Lateral force valve 512 is coupled to hinge 508. Hinge 508 is coupled to valve cover 502 and it limits the movement of lateral force valve 512 to lateral directions. For example, as discussed above with reference to FIG. 3, hinge 508 limits the movement of lateral force valve 512 in forward and aft directions but permits lateral force valve to move in lateral directions (e.g., from side to side). Thus, a lateral force valve can move the lateral force valve relative to the engine valve cover when a vehicle in which lateral force valve is mounted enters a left-hand or right-hand turn. However, if the vehicle accelerates or decelerates in a straight line, the lateral acceleration remains in a substantially constant position relative to the valve cover.

Spring 514 is configured to provide an opening force for lateral force valve 512 when lateral force valve 512 is in a closed position. Thus, spring 514 overcomes at least a portion of vacuum force that may be applied to lateral force valve through conduit 504 when lateral force valve 512 is in a closed position. The spring force may be adjusted according to a desired release vacuum. For example, the spring tension applied by spring 514 may be set so that lateral force valve 512 releases at a vacuum of less than 0.6 atmospheres when there is less than a threshold level of lateral or centripetal force applied to the engine or vehicle.

Referring now to FIG. 6A, a schematic diagram of an example butterfly type lateral force PCV valve is shown. The butterfly lateral force valve illustrated in FIG. 6A is a valve that operates within a conduit (e.g., an inline valve), the conduit linking the engine crankcase to the engine intake system (e.g., linking a valve cover and the engine intake system). FIG. 6A illustrates a cross-section of the butterfly lateral acceleration valve in an open position. Butterfly lateral acceleration valve 604 is configured in a normally open position. Specifically, lever 608 is coupled to gear 606 which drives gear 602. In one example, lever 608 is weighted at its end. Gear 602 is coupled to butterfly lateral acceleration valve 604. Lever 608 is oriented in a vertical position perpendicular to butterfly lateral acceleration valve during conditions of low lateral or centripetal force. Gravity acts on lever 608 to orient lateral acceleration valve 604 in the open position as is shown.

In this example, engine crankcase gases flow through conduit 600 in the direction illustrated by the arrow.

Gear 606 is sized larger than gear 602 so that butterfly lateral acceleration valve 604 closes at an angle of less than 90° from vertical. By increasing the diameter of gear 606 and reducing the diameter of gear 602, it is possible to close butterfly lateral acceleration valve 604 with reduced rotation. It should be mentioned that other valve embodiments are anticipated by this disclosure but not shown. For example, a lateral acceleration valve may be configured as an aperture device.

Referring now to FIG. 6B, a schematic diagram of an example butterfly lateral force PCV valve is shown. The butterfly lateral force valve illustrated in FIG. 6B is identical to the butterfly lateral force valve shown in FIG. 6A; however, the valve shown in FIG. 6B is shown in a closed position while butterfly lateral or centripetal forces are acting on an engine to which the valve is coupled.

Butterfly lateral acceleration valve 604 closes when forces act on the engine and cause gears between lever 606 and lateral acceleration valve 604 and a lever to rotate. The angle between lever 608 and conduit 600 changes as shown and gears 606 and 602 rotate and close valve 604. In this way, butterfly lateral acceleration valve closes when lateral or centripetal force is applied to the engine.

Figure 7A:
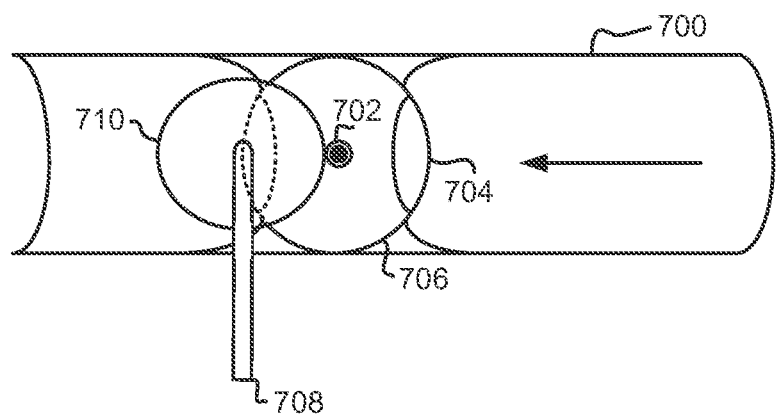
FIG. 7A is a schematic diagram of a second example lateral force PCV valve.

Referring now to FIG. 7A, a schematic diagram of a second example lateral force PCV valve is shown. In particular, a ball type lateral acceleration valve is shown. Lateral acceleration ball valve 706 is configured in a normally open position. Ball 706 is shown in an open condition within conduit 700. Ball 706 includes an opening 704 through which crankcase gases may pass. Lever 708 is coupled to gear 710 which drives gear 702. In one example, lever 708 is weighted at its end. Gear 702 is coupled to lateral acceleration ball 706. Lever 708 is oriented in a position perpendicular to lateral acceleration ball valve during conditions of low lateral or centripetal force. Gravity acts on lever 708 to orient lateral acceleration ball valve 706 in the open position as is shown. In this example, crankcase gases flow through conduit 700 in the direction illustrated by the arrow.

Gear 710 is sized larger than gear 702 so that lateral acceleration ball valve 706 closes at an angle of less than 90° from vertical. By increasing the diameter of gear 710 and reducing the diameter of gear 702, it is possible to close ball lateral acceleration valve 706 with reduced rotation.

Figure 7B:
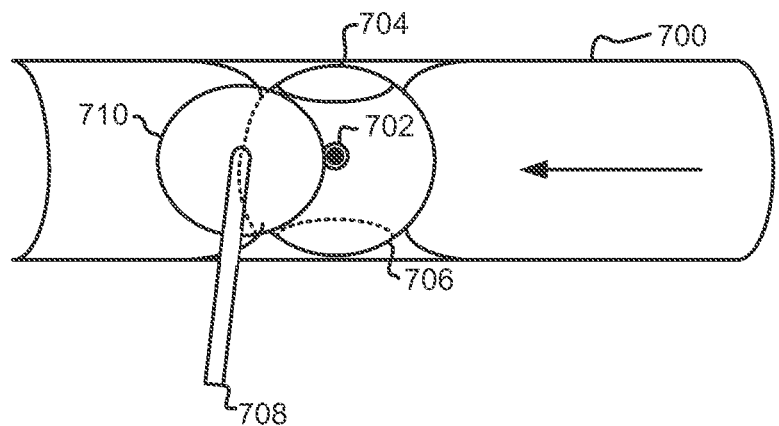
FIG. 7B is a schematic diagram of a second example lateral force PCV valve.

Referring now to FIG. 7B, a schematic diagram of a second example lateral force PCV valve is shown. The lateral force valve illustrated in FIG. 7B is identical to the lateral force valve shown in FIG. 7A; however, the valve shown in FIG. 7B is shown in a closed position while lateral or centripetal forces are acting on an engine to which the valve is coupled.

Lateral acceleration ball valve 706 closes when forces act on the engine and cause gears between lever 706 and lateral acceleration ball valve 706 and a lever to rotate. The angle between lever 708 and conduit 700 changes as shown and gears 706 and 702 rotate and close ball valve 706. In this way, ball type lateral acceleration valve closes when lateral or centripetal force is applied to the engine.

Butterfly and ball type lateral acceleration valves may include seals in some examples. The seals may better limit the flow of liquids in a PCV conduit. In one example, the seal may be an elastomer type seal. Further, in some examples the valves of FIGS. 6A-6B and 7A-7B may move in only one direction of lateral force or centripetal acceleration.

Note that in some examples, the lateral or centripetal force valves include a switch to indicate the position of the valve (e.g., whether the valve is open or closed). However, the valves shown in FIGS. 3-7B are mechanically operated by forces acting on the vehicle and engine. In another example, an accelerometer can be used to open and close a lateral force valve. For example, an accelerometer of a vehicle stability control system is input to a circuit that opens or closes an electrically operated solenoid valve when lateral force greater than a threshold amount acts on the engine or vehicle. In one example, the accelerometer circuit may comprise a controller with instructions to activate a valve to close a PCV passage when lateral or centripetal force exceeds a threshold value. In some examples, the controller also includes instructions for controlling engine torque via spark, fuel, and valve timing. The controller under some conditions may limit engine torque when lateral or centripetal force exceeds a second threshold level. In this way, the lateral force PCV valve can be automated from a solely mechanically actuated valve to an electrically actuated valve if desired.

Thus, the system illustrated by FIGS. 1-7B provides for an engine system, comprising: an engine; and a mechanically operated valve coupled to the engine, the mechanically operated valve activated when lateral or centripetal force acting on an engine exceeds a threshold amount, the mechanically operated valve limiting flow from a crankcase of the engine to a PCV passage when activated. The engine system also includes where the mechanically operated valve includes a hinge. The engine system further includes where the mechanically operated valve is comprised of two sections located about the hinge, and where a first of the two sections limits flow through a PCV valve when the centripetal or the lateral force acting on the engine exceeds a threshold amount. The engine system includes where the second section acts to open the mechanically operated valve when the centripetal or lateral or force acting on the engine is less than the threshold amount. The engine system includes where the mechanically operated valve includes a seal for limiting a flow of oil through the mechanically operated valve. The engine system includes where the PCV passage provides a communication link between a crankcase of the engine. The engine system includes where opening of the mechanically operated valve is assisted. In addition, the engine system includes where the assistance of opening the lateral force PCV valve is provided by a spring.

The system illustrated by FIGS. 1-7B also provides for an engine system, comprising: an engine; an engine intake system comprising an intake manifold and a throttle; a PCV valve limiting flow from a crankcase of the engine to the engine intake system; and valve limiting flow of crankcase vapors through a PCV passage when a centripetal or a lateral force acting on the engine exceeds a threshold amount. The engine system includes where the valve limiting flow of crankcase vapors includes a hinge and the valve limiting flow of crankcase vapors has an acute angle between a flapper door that closes the PCV passage and an arm that moves the valve limiting flow of crankcase vapors in response to a lateral force. The engine system includes where the valve limiting flow of crankcase vapors is located along the length of the PCV passage. The engine system also includes where the valve limiting flow of crankcase vapors includes a weighted arm that is coupled to a hinge of the valve limiting flow of crankcase vapors, the hinge allowing lateral motion of the weighted arm and limiting fore and aft motion of the weighted arm. The engine system also includes where the valve limiting flow of crankcase vapors through a PCV passage when a centripetal or lateral force acting on the engine exceeds a threshold amount is located within the engine.

Thus, the system of FIGS. 1-7B also provides for an engine system, comprising: an engine having a crankcase and an intake system; a PCV conduit linking the crankcase and the intake system; a mechanically operated valve located along the PCV conduit, the mechanically operated valve activated when lateral or centripetal force acting on an engine exceeds a threshold amount, the mechanically operated valve limiting flow from a crankcase of the engine to a PCV passage when activated. The engine system includes where a lever is coupled to the mechanically operated valve. The engine system includes where the mechanically operated valve is a ball valve. The engine system includes where the mechanically operated valve is a butterfly valve. The engine system includes where the mechanically operated valve includes a seal for limiting a flow of oil through the mechanically operated valve. The engine system includes where the PCV conduit is oriented such that liquid drains from the PCV conduit in a direction toward the crankcase when the mechanically operated valve is not activated. The engine system includes where the lever includes a weight. The engine system includes where the lever is coupled to a gear set for opening and closing the mechanically operated valve.

The system illustrated by FIGS. 1-7B also provides for an engine system, comprising: an engine having a crankcase; an engine intake system comprising an intake manifold and a throttle; a PCV conduit external to the engine and coupling the engine intake system and the crankcase; a PCV valve limiting flow from a crankcase of the engine to the engine intake system via the PCV conduit; and a valve located along the PCV conduit, the valve limiting flow of vapors through the PCV conduit when a centripetal or a lateral force acting on the engine exceeds a threshold amount. The engine system includes where the valve located along the PCV conduit includes a lever arm coupled to the valve. The engine system includes where the lever arm is coupled to a gear set. The engine system includes where the lever arm acts through less than 90 degrees to close the valve located along the PCV conduit. The engine system includes where the valve located along the PCV conduit closes in response to a centripetal or a lateral force in a first direction and remains open in response to an equivalent force in a second direction opposite the first direction.

Figure 8:
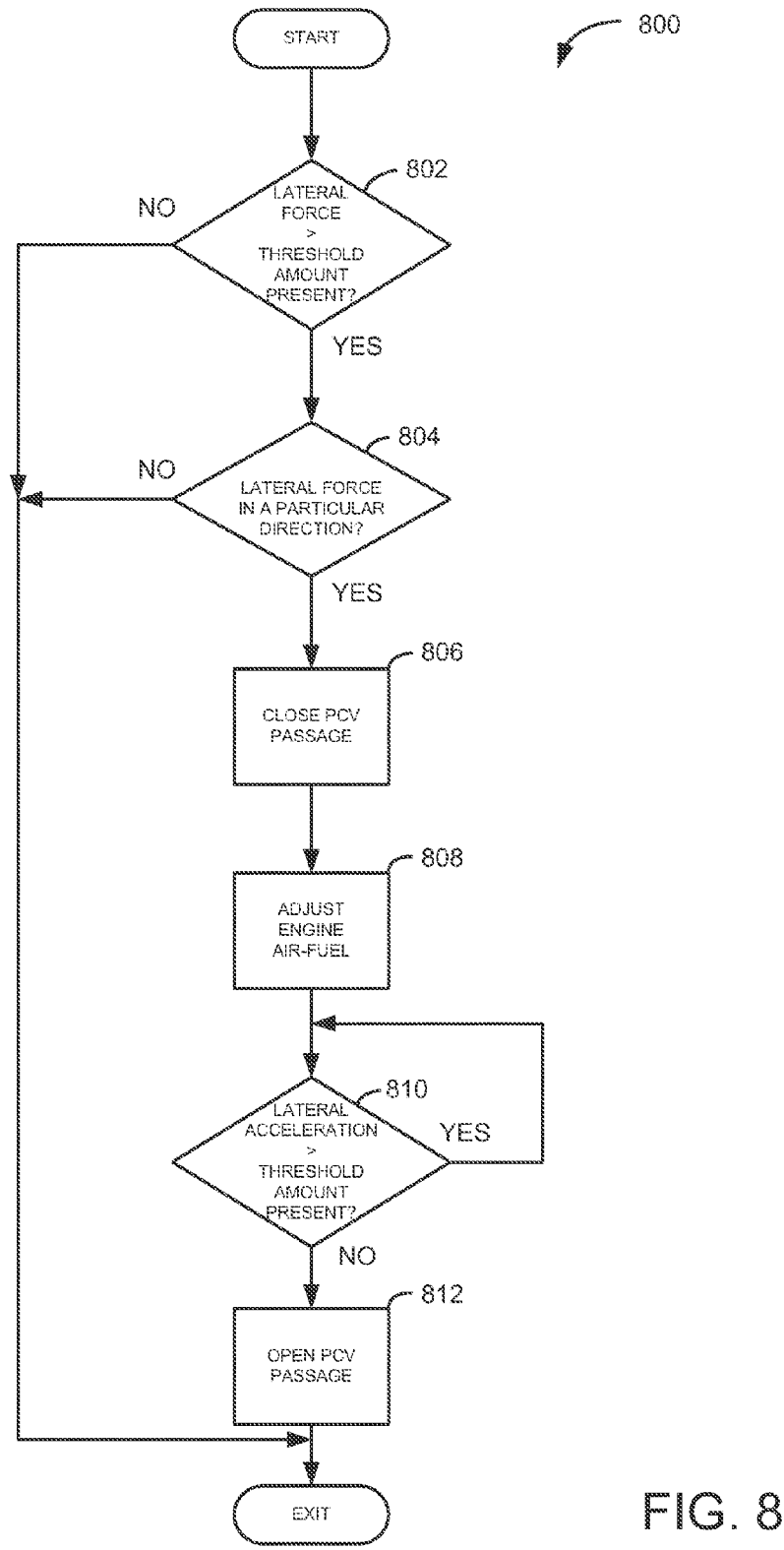
FIG. 8 is a plot of a flowchart of a method for limiting PCV flow during conditions of lateral or centripetal force.

Referring now to FIG. 8, a plot of a flowchart of a method for limiting PCV flow during conditions of lateral or centripetal force is shown. At 802, method 800 judges whether or not lateral or centripetal force is greater than a threshold amount. In one example, the lateral force greater than a threshold amount may be determined by the position of a mechanical lever relative to a valve cover or of a position of a mechanical lever relative to a PCV conduit. In such an example, the mechanical lever may change the state of an output of a switch when a lateral force applied to the engine or vehicle exceeds a threshold level. In another example, method 800 may judge that lateral force acting on the vehicle and engine is greater than a threshold level in response to an output of a sensor, an accelerometer for example. If method 800 judges lateral acceleration to be greater than a threshold amount, method 800 proceeds to 804. Otherwise, method 800 proceeds to exit.

At 804, method 800 judges whether or not lateral force is in a particular direction. For example, method 804 can judge if a lateral force applied to the engine and vehicle is in a direction that may cause engine oil to accumulate near a PCV path. The direction of lateral force may be determined from the polarity of output of an accelerometer or the state of a switch that is activated by a mechanically operated device. If lateral force is in a direction that can cause engine oil to accumulate near the PCV valve or that can cause engine oil to migrate to the PCV path, method 700 proceeds to 806. Otherwise, method 800 proceeds to exit.

At 806, method 800 closes the PCV passage. In one example, the PCV passage is closed in response to manual activation of a lateral force valve. For example, the lateral forces acting on a vehicle or engine cause the lateral PCV valve to close. In another example, the PCV passage is closed in response to an output of a controller that includes instructions for closing the PCV passage when lateral or centripetal force is greater than a threshold level and while the lateral force is in a particular direction. The PCV passage can be closed by activating an electrically actuated solenoid. Method 800 proceeds to 808 after the PCV passage is closed.

At 808, method 800 adjusts the engine air-fuel ratio to compensate for a closed PCV passage. In one example, the engine air-fuel ratio can be adjusted by adding a predetermined amount of fuel to the engine air-fuel mixture. In another example, the engine fuel amount can be adjusted in response to an oxygen sensor output after the PCV passage is closed. In yet another example, a predetermined amount of fuel can be added to the desired engine air-fuel mixture while an amount of fuel supplied to the engine is adjusted according to the output of an oxygen sensor located in the exhaust system. Method 800 proceeds to 810 after the engine air-fuel mixture is adjusted.

At 810, method 800 judges whether or not lateral or centripetal force applied to the engine or vehicle is greater than a threshold amount. If so, method 800 returns to 810 to wait until the lateral or centripetal acceleration is less than a threshold. If not, method 800 proceeds to 812.

At 812, method 800 opens the PCV passage. In one example, the PCV passage is opened in response to the lateral forces being reduced to a level that allows a mechanically actuated lateral force PCV valve to open. In another example, the PCV passage is opened in response to an output of a controller that includes instructions for opening the PCV passage when the lateral or centripetal force is greater than a threshold level. The PCV passage is opened by deactivating an electrically actuated solenoid.

Thus, the method of FIG. 8 provides for a method for improving engine crankcase ventilation, comprising: providing a flow of gases from a crankcase of an engine to an intake system of the engine; and during a condition when a lateral force or a centripetal force acting on the engine is greater than a threshold amount, limiting the flow of gases from the crankcase to the intake system. The method includes where the flow of gases is limited in a first direction of lateral or centripetal force but not in a second direction of lateral or centripetal force. Further, the method includes where the flow of gases is limited by an electrically actuated valve in response to a signal provided by an accelerometer. The system also includes where the accelerometer is part of a vehicle stability control system. The method of claim 14 also includes where the flow of gases is limited by a mechanically operated valve. The method includes where the valve is a mechanically operated valve that includes a hinge that allows the valve to move in a direction to or from the lateral or centripetal force but not in a direction of fore or aft force. The engine method includes where the valve is opened when the intake manifold pressure is less than a predetermined threshold level and when the lateral or centripetal force is less than a predetermined threshold amount. The method further comprises providing an indication of a condition of limited PCV flow when the lateral force or the centripetal force is greater than a threshold amount and adjusting the engine air-fuel ratio in response to the indication. The method also includes where the valve increases the lateral force or the centripetal force by acting through a distance.

The method of FIG. 8 also provides for a method for improving engine crankcase ventilation, comprising: providing a flow from a crankcase of an engine to an intake system of the engine via a conduit external from the engine; during a condition when a lateral force or a centripetal force acting on the engine is greater than a threshold amount, limiting flow from the crankcase to the intake system via the conduit; and draining liquids from the conduit to the crankcase when the lateral force or centripetal force is less than the threshold amount. The method including where the flow is limited in a first direction of lateral or centripetal force, and where the flow is less limited in a second direction of lateral or centripetal force. The method includes where the flow is a flow of gases or liquids, or a combination of gases and liquids, and where the flow is limited by a valve. The method includes where the valve is a mechanically operated valve that includes a lever arm to move in a direction to or from the lateral or centripetal force but not in a direction of fore or aft force. The engine method includes where the lever arm is coupled to a gear set. The method further comprises providing an indication of a condition of limited PCV flow when the lateral force or the centripetal force is greater than a threshold amount and adjusting the engine air-fuel ratio in response to the indication. The method includes where the valve effectively amplifies the lateral force or the centripetal force by acting through a distance.

As will be appreciated by one of ordinary skill in the art, the method described in FIG. 8 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine system, comprising:
   an engine having a crankcase and an intake system;
   a PCV conduit linking the crankcase and the intake system;
   a mechanically operated valve located along the PCV conduit and coupled to a lever, the mechanically operated valve activated when lateral or centripetal force acting on the engine exceeds a threshold amount, the mechanically operated valve limiting flow from the crankcase of the engine to a PCV passage when activated.

2. The engine system of claim 1, where the mechanically operated valve is a ball valve.

3. The engine system of claim 1, where the mechanically operated valve is a butterfly valve.

4. The engine system of claim 1, where the mechanically operated valve includes a seal for limiting a flow of oil through the mechanically operated valve.

5. The engine system of claim 1, where the PCV conduit is oriented such that liquid drains from the PCV conduit in a direction toward the crankcase when the mechanically operated valve is not activated.

6. The engine system of claim 1, where the lever includes a weight.

7. The engine system of claim 6, where the lever is coupled to a gear set for opening and closing the mechanically operated valve.

8. An engine system, comprising:
   an engine;
   an engine intake system comprising an intake manifold and a throttle;
   a PCV conduit external to the engine; and
   a valve located along the PCV conduit, the valve including a normally open position and a closed position that it is activated via a centripetal or a lateral force acting on the engine, a lever being coupled to a gear set for opening and closing the valve.

9. The engine system of claim 8, where the valve is a ball valve.

10. The engine system of claim 9, where the lever is in a perpendicular orientation with respect to the ball valve.

11. The engine system of claim 8, where the gear set includes a first gear and a second gear, the first gear having a different size than the second gear.

\* \* \* \* \*